March 15, 1938. F. C. LEONARD ET AL 2,110,884
THERMOSTATIC DEVICE
Filed May 21, 1932 2 Sheets-Sheet 1

Inventors
Frederick C. Leonard
Germaine Ross
By Nathaniel Frucht
their Attorney

March 15, 1938. F. C. LEONARD ET AL 2,110,884
THERMOSTATIC DEVICE
Filed May 21, 1932  2 Sheets-Sheet 2

Inventors
Frederick C. Leonard
Germain Ross
By Nathaniel Frucht
their Attorney

Patented Mar. 15, 1938

2,110,884

UNITED STATES PATENT OFFICE 2,110,884

THERMOSTATIC DEVICE

Frederick C. Leonard, Cranston, and Germain Ross, Providence, R. I.

Application May 21, 1932, Serial No. 612,760

6 Claims. (Cl. 236—12)

Our present invention relates to thermostatic mixing regulators, and has particular reference to regulators for maintaining a desired temperature of flowing water.

The principal object of our invention is to devise a thermostatic regulator of inexpensive construction, adapted to control fluid flows accurately, and capable of maintaining the temperature of the flowing fluid substantially constant.

A further object of our invention is to design the mixing chamber and the flow area so as to ensure adequate mixing of the hot and cold streams prior to contact with the thermostatic element.

An additional object of our invention is to devise valve constructions which are not changed in setting by variations and relative differences in the pressures of the hot and cold fluids.

Another object of our invention is to provide a regulator construction that is extremely rugged, is not easily deranged, and cannot be rendered inoperative short of actual breakage.

With the above and other objects and advantageous features in view the invention consists of a novel regulator construction and a novel inlet flow control therefor, more fully disclosed in the detailed description following, in conjunction with the accompanying drawings, and more particularly defined in the claims appended thereto.

Figure 1:
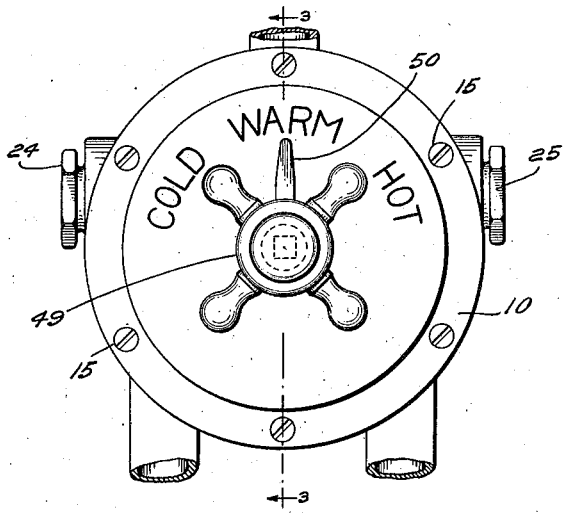
Fig. 1 is a top plan view of the novel regulator.

Referring to the drawings, the improved regulator comprises a front member 10 in which the thermostatic element, the setting mechanism, and the valve operating mechanism are housed, and a back member 11 in which the valve mechanism is housed, both members being preferably cast of brass. The back and front members have annular machined flanges 12, 13 between which a packing 14 is positioned, the two members being secured together by screws or the like 15 which pass through suitable openings in the flange 13 and screw threadedly or otherwise engage the flange 12.

Figure 4:
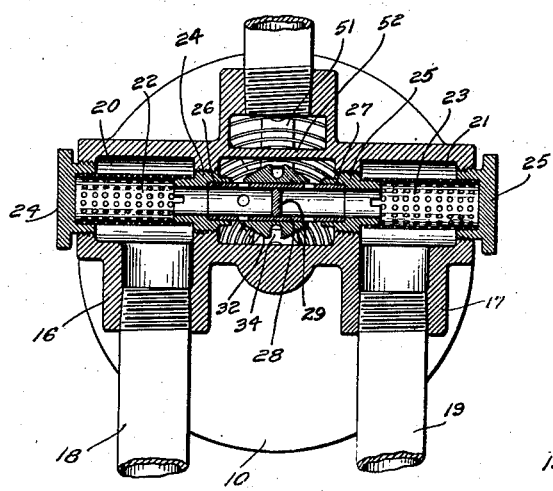
Fig. 4 is a section on the line 4—4 of Fig. 3.

As best shown in Fig. 4, the back member has two inlets, 16, 17 threaded to receive the correspondingly threaded ends 18, 19 of inlet conduits for fluids of different temperatures. The incoming fluids enter chambers 20, 21 in which cylindrical strainers 22, 23 are mounted, the strainers being secured at their outer ends to caps 24, 25 which are threaded in suitable openings in the ends of the chambers and are thus adapted to be readily removed for cleaning. The inner ends of the strainers engage the ends of bearing nipples 24, 25 which are screw threadedly mounted at the other ends of the chambers, and have recesses 26, 27 which receive the ends of an inlet cylinder 28 which as shown is provided with a partition 29 or the like to keep the entering fluids from mixing. The cold side of the inlet cylinder has three lateral ports 30, and the hot side has two lateral ports 31, these ports being controlled by a slide valve 32, having opposed conical faces 33 and a central groove 34 for receiving the operating arm of the thermostatic control, as hereinafter described. The inlet cylinder is positioned so as to direct the inflowing streams of fluids generally away from the thermostatic coil, thus producing mixing before the fluids reach the thermostatic coil.

Figure 2:
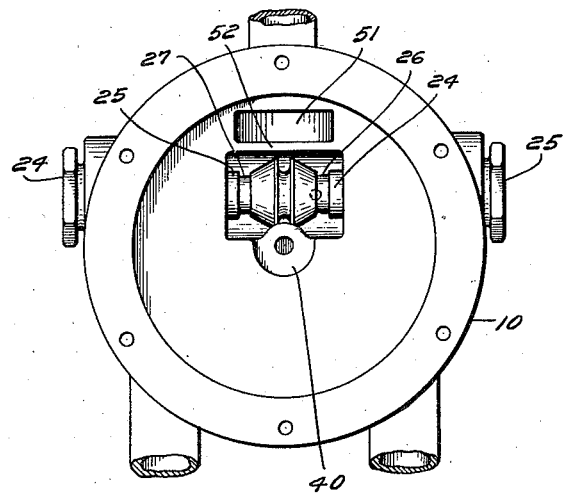
Fig. 2 is a view thereof with the front portion removed, showing the flow control valve.
Figure 5:
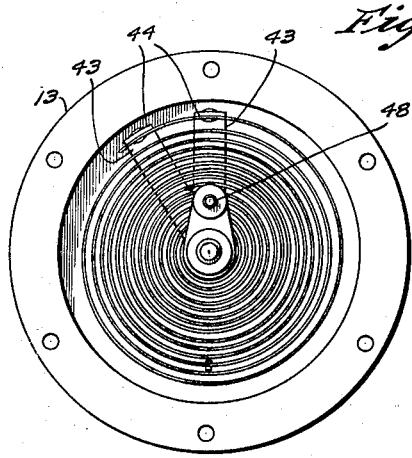
Fig. 5 is a bottom view of the front portion, showing the thermostatic coil.
Figure 6:
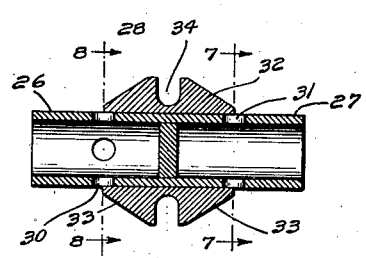
Fig. 6 is an enlarged view of the valve and valve seat.
Figures 7, 8:
Fig. 7 is a section of Fig. 6 on the line 7—7.
Fig. 8 is a section of Fig. 6 on the line 8—8.

Referring to Figs. 2 and 5, now, the front member is cup-shaped to house the thermostatic element 35, this element being formed as a spiral coil. An operating shaft 36 is rotatably mounted in the central bushing 37 of the front member, which is recessed to receive the usual packing 38 held in place by the flange nut 39 which screw threadedly seats in the central bushing recess. The end of the operating shaft is reduced slightly to form a shoulder 40, and seats in a bore 41 of a thrust bearing member 42 provided in the back member, whereby the operating shaft and its operating parts cannot be forced down, as for example by a blow on the handle or the end of the shaft, so as to damage the valve mechanism.

A radial plate 43 is pinned or otherwise secured to the shaft 36, and is bent over at its end to provide a lock plate 44 which is riveted or otherwise secured to the outer end of the thermostatic coil. A thimble 46 is rotatably mounted on the shaft 36 and is secured to the inner end of the thermostatic element, and has an operating arm 47, preferably integral therewith, with a depending finger 48 which is positioned in the valve groove 34. The end of the operating shaft is squared to receive a handle 49 and a pointer or indicator 50, which may cooperate with a graduated temperature plate mounted as indicated by the dotted line in Fig. 3, or may be bent over to cooperate with indications on the front member such as shown in Fig. 1.

Figure 3:
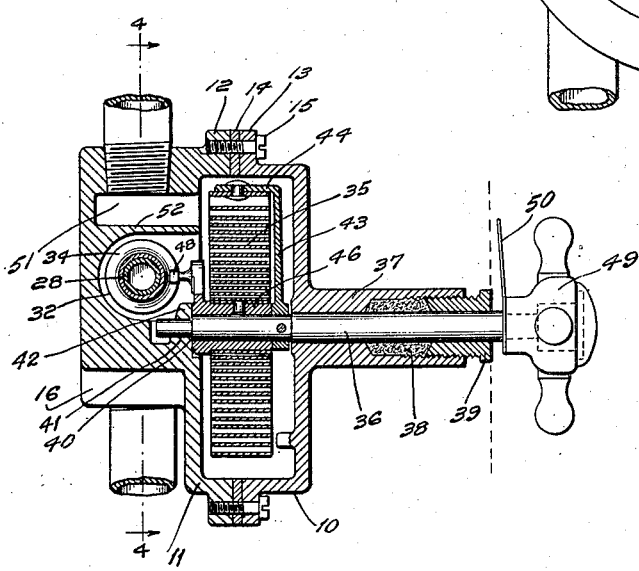
Fig. 3 is a section on the line 3—3 of Fig. 1.

The mixed fluid passes upwardly from the valve chamber, through the thermostatic coil, and out through the outlet chamber 51, see Fig. 3, which as shown is separated from the valve chamber by a partition 52.

It has been found that surge is produced where pockets of hot and cold water are alternately formed within the regulator, and that the above described construction prevents surge by directing most of the incoming fluid into the mixing chamber, and permitting a small amount of the hot and the cold fluid to enter the upper chamber. It has also been determined that better regulation is obtained if the inlet opening for the cold water is slightly larger than the inlet opening for the hot water; although the reason for this is not clear, the experimental information obtained has indicated that the combination of three inlet ports for the cold water and two inlet ports for the hot fluid is satisfactory.

The valve mechanism described is balanced, as the fluid inlets direct the flow across the valves. The valve is not therefore affected by variations or relative differences in the pressures of the hot and the cold fluids, as the entering streams are in substantially parallel planes. Observation has disclosed that the hot and cold streams diverge towards the sides, as the flow begins, and then become radial with respect to the inlet cylinder as the flow increases. Preferably, the ports are positioned so that the outflowing fluids do not directly contact the thermostatic element which is mounted in the front member. The conical form of the valve ends has been found to facilitate the mixing of the hot and cold fluids.

Referring to Figs. 3 and 4, the operation of the novel small flow thermostatic regulator may now be explained:

The handle is first manually turned to bring the pointer or indicator opposite the desired temperature indication; at this setting the thermostatic coil assumes a position such that it would be without strain, if the temperature of the mixed fluid corresponded to the temperature indication. The hot and cold water streams entering the inlet cylinder pass radially through the inlet ports, and mix to pass between the thermostatic coils to the outlet chamber. As will be noted from Fig. 3, the available flow space is restricted to a minimum, thus forcing the mixed fluid to pass through the thermostatic coil convolutions and to the outlet chamber, without local eddies or disturbances.

If the temperature of the mixture changes from the set temperature due to change in temperature of the hot or cold fluid, the thermostatic coil expands or contracts to shift the valve and thus vary the relative volume of hot and cold fluid. The radial inlet ports, the conical form of the valve ends, the mixing, and the limited flow space, result in an instant response to temperature changes without surging.

Figure 9:
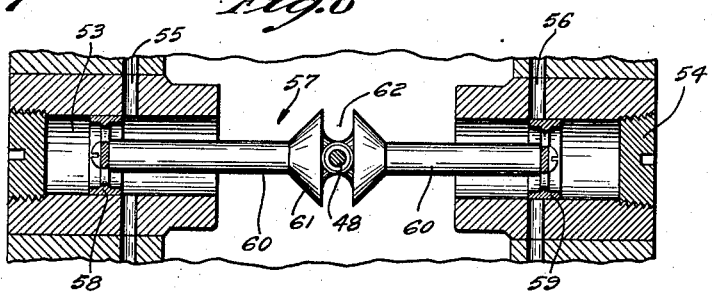
Fig. 9 is a sectional view of a modified construction of the valve and valve seat.

If desired, a balanced valve construction such as shown in Fig. 9 may be used. In this form, the inlet chambers 53, 54 have lateral ports 55, 56, controlled by a slide valve 57 which has two cylindrical valve sections 58, 59, the sections being secured by spiders to central rods 60 which end in inner conical portions 61 with a central groove 62 adapted to receive the operating finger of the control mechanism. This construction balances the flow to the mixing chamber, and thus controls the inlet areas independently of fluid pressure differences or variations. If the pressure of the fluids is high, it may be advisable to mount stationary deflectors around the rods 60, to deflect the water away from the conical portions 61 and thus eliminate side thrust of the inflowing fluids on the valve mechanism.

While we have described specific embodiments of our invention, such changes in the design, in the proportions, and in the arrangement of the parts may be made to suit particular or special requirements for thermostatic regulators, without departing from the spirit or the scope of the invention as defined in the appended claims.

We claim:—

1. In a thermostatic regulator, a mixing chamber, inlets for conducting hot and cold fluid to said mixing chamber, reciprocatable valve mechanism controlling flow from said inlets to said mixing chamber, a rotatable control shaft, a thermostatic element fixed at one end to said control shaft, and having an element at the other end operatively connected to said valve mechanism, and a thrust bearing engaging said control shaft to limit movement of said control shaft and its associated mechanism towards said valve mechanism.

2. In a thermostatic regulator, a mixing chamber, inlets for conducting hot and cold fluid to said mixing chamber, valve mechanism controlling flow from said inlets to said mixing chamber, a rotatable control shaft, a thermostatic element fixed at one end to said control shaft, and having an element rotatably mounted on said control shaft and at the other end operatively engaging said valve mechanism, and a thrust bearing engaging said control shaft to limit movement of said control shaft and its associated mechanism towards said valve mechanism.

3. In a thermostatic regulator, a back member having fluid inlets for hot and cold fluid and valve mechanism for controlling flow of said fluids, and a front member having a control shaft, a thermostatic element secured at one end to said shaft, and having an operating element at the other end of said thermostatic element rotatably mounted on said control shaft and operatively connected to said valve mechanism, and a thrust bearing in said back member for the end of said control shaft.

4. In a thermostatic regulator, a back member having fluid inlets for hot and cold fluid and valve mechanism for controlling flow of said fluids, and a front member having a control shaft, a thermostatic element secured at one end to said shaft, and having an operating element at the other end of said thermostatic element rotatably mounted on said control shaft and operatively engaging said valve mechanism, and a thrust bearing in said back member for the end of said control shaft.

5. In a mixing valve, a mixing chamber, an outlet chamber adjacent thereto and separated therefrom by a partition, a thermostatic chamber freely communicating with the mixing and outlet chambers, means comprising a tubular conduit device having a central partition and ports on each side of said partition for conducting a hot and a cold fluid into said mixing chamber, valve mechanism for controlling the relative quantities of said fluids, and thermostatic means in said thermostatic chamber operatively controlling said valve mechanism.

6. In a mixing valve, a mixing chamber, an outlet chamber, a thermostatic chamber freely communicating with the mixing and outlet chambers, means comprising a tubular conduit device having a central partition and ports on each side of said partition for conducting a hot and a cold fluid into said mixing chamber, valve mechanism slidably mounted on said tubular conduit device for controlling the relative quantities of said fluids, said valve mechanism comprising conical deflector elements positioned adjacent said ports and inclined to direct the hot and cold fluids from said ports towards each other, and thermostatic means in said thermostatic chamber operatively controlling said valve mechanism.

FREDERICK C. LEONARD.
GERMAIN ROSS.